US006624238B1

(12) United States Patent
Ott et al.

(10) Patent No.: US 6,624,238 B1
(45) Date of Patent: Sep. 23, 2003

(54) INTRINSICALLY VISCOUS CLEAR POWDER COATING SLURRY WHICH IS FREE OF ORGANIC SOLVENTS AND EXTERNAL EMULSIFIERS, METHOD FOR PRODUCING SAID SLURRY AND USE OF THE SAME

(75) Inventors: Günther Ott, Münster (DE); Ulrike Röckrath, Senden (DE); Maximilian Bendix, Oelde (DE); Joachim Woltering, Münster (DE); Fatmir Raka, Münster (DE); Ute Schuhmacher, Münster (DE); Ulrich Poth, Münster (DE)

(73) Assignee: BASF Coatings AG, Muenster-Hiltrup (DE)

( * ) Notice: Subject to any disclaimer, the term of this patent is extended or adjusted under 35 U.S.C. 154(b) by 0 days.

(21) Appl. No.: 09/786,956

(22) PCT Filed: Sep. 8, 1999

(86) PCT No.: PCT/EP99/06604

§ 371 (c)(1),
(2), (4) Date: Mar. 12, 2001

(87) PCT Pub. No.: WO00/15721

PCT Pub. Date: Mar. 23, 2000

(30) Foreign Application Priority Data

Sep. 12, 1998 (DE) .......................................... 198 41 842

(51) Int. Cl.⁷ ................................................. C08K 3/00
(52) U.S. Cl. .................................................... 524/591
(58) Field of Search .......................................... 524/591

(56) References Cited

U.S. PATENT DOCUMENTS

| 4,071,428 | A |   | 1/1978  | Bosso et al. ............... 204/181 |
| 4,268,542 | A |   | 5/1981  | Sakakibara et al. ......... 427/195 |
| 4,332,711 | A |   | 6/1982  | Kooymans et al. ......... 523/402 |
| 4,482,721 | A |   | 11/1984 | Wegner et al. .............. 548/262 |
| 4,578,426 | A |   | 3/1986  | Lenz et al. ................. 525/131 |
| 4,939,213 | A |   | 7/1990  | Jacobs, III et al. ........ 525/329.9 |
| 5,084,541 | A |   | 1/1992  | Jacobs, III et al. ........... 528/45 |
| 5,288,865 | A |   | 2/1994  | Gupta ......................... 544/200 |
| 5,475,073 | A |   | 12/1995 | Guo ............................ 526/333 |
| 5,480,493 | A |   | 1/1996  | Harry, Jr. ....................... 134/4 |
| 5,534,598 | A |   | 7/1996  | Guo ......................... 525/329.2 |
| 5,719,246 | A |   | 2/1998  | Taniguchi et al. .......... 526/320 |
| 5,817,733 | A |   | 10/1998 | Rink ............................. 528/71 |
| 5,852,120 | A |   | 12/1998 | Bederke et al. ............. 525/124 |
| 5,889,106 | A |   | 3/1999  | Kurek et al. ................ 524/589 |
| 5,981,653 | A |   | 11/1999 | Wilmes et al. .............. 524/839 |
| 6,093,497 | A | * | 7/2000  | Wiemann .................... 428/500 |
| 6,129,989 | A | * | 10/2000 | Sapper ........................ 428/500 |
| 6,156,117 | A | * | 12/2000 | Freeman ..................... 106/487 |
| 6,177,487 | B1 |  | 1/2001  | Sapper et al. ............... 523/333 |
| 6,187,384 | B1 |  | 2/2001  | Wilke et al. .............. 427/388.4 |
| 6,360,974 | B1 |  | 3/2002  | Sacharski et al. ............. 241/16 |

FOREIGN PATENT DOCUMENTS

| CA | 2216111      | 4/1996  | ......... C09D/133/14 |
| CA | 2224864      | 6/1996  | ......... C09D/163/00 |
| DE | 25 07 842 A1 | 2/1975  | ............ C09D/3/80 |
| DE | 44 01 544 A1 | 7/1995  | ........... C08G/18/32 |
| DE | 195 40 977 A1 | 11/1995 | ........... C09D/5/46 |
| DE | 195 34 361 A1 | 3/1997  | ........... C09D/175/14 |
| DE | 195 40 977 A1 | 5/1997  | ............ C09D/5/46 |
| DE | 196 52 842 A1 | 6/1997  | ............ B05D/7/26 |
| DE | 196 17 086 A1 | 10/1997 | ............. B01F/3/12 |
| DE | 196 23 371 A1 | 12/1997 | ........... C08G/18/28 |
| DE | 196 31 269 A1 | 2/1998  | ........... C08G/18/80 |
| EP | 0 004 571 A1 | 3/1978  | ......... C07D/249/08 |
| EP | 0 012 463 A1 | 12/1978 | ........... C09D/5/40 |
| EP | 0 038 127 a1 | 4/1980  | ............ B05D/7/26 |
| EP | 548 690      | 12/1992 | ............ B05D/3/00 |
| EP | 0 652 264 A2 | 11/1993 | ........... C09D/5/03 |
| EP | 604 922      | 12/1993 | ......... C08K/5/3492 |
| EP | 612 818      | 2/1994  | ............ C09D/5/44 |
| EP | 0 612 818 A1 | 2/1994  | ............ C09D/5/44 |
| EP | 0 708 788 B1 | 6/1994  | ........... C08G/18/08 |
| EP | 0 767 185 A1 | 6/1995  | ......... C08F/212/06 |
| GB | 1 530 021    | 2/1976  | ............. C08J/3/10 |
| GB | 1 530 022    | 2/1976  | ............. C08J/3/10 |
| WO | WO00/69979   | 3/1926  | ............ C09D/5/02 |
| WO | WO 96/32452  | 10/1996 | ......... C09D/133/06 |
| WO | WO 97/01609  | 1/1997  | ......... C09D/163/00 |
| WO | WO98/29465   | 7/1998  | ......... C09D/163/00 |

OTHER PUBLICATIONS

English translation of EP, 0 708 788 B1, U.S. Ser. No. 08/564,304 filed Jan. 22, 96, Bernd Mayer et al., pp. 1–38.
English Abstract for DE 196 23 371 A1.
English Abstract for DE 196 52 842 A1.
English Abstract for WO 97/01609.
English Abstract for WO 96/32452.

* cited by examiner

*Primary Examiner*—Edward J. Cain

(57) ABSTRACT

A pseudoplastic powder clearcoat slurry which is free from organic solvents and external emulsifiers and comprises solid spherical particles with an average size of from 0.8 to 20 $\mu$m and a maximum size of 30 $\mu$m, at least one ionic thickener and at least one nonionic associative thickener, the powder clearcoat slurry having an ion-forming group content of from 0.05 to 1 meq/g, a neutralizing agent content of from 0.05 to 1 meq/g, and a viscosity of (i) from 50 to 1 500 mPas at a shear rate of $1\,000\ s^{-1}$, (ii) from 150 to 8 000 mPas at a shear rate of $10\ s^{-1}$, and (iii) from 180 to 12 000 mPas at a shear rate of $1\ s^{-1}$.

17 Claims, No Drawings

INTRINSICALLY VISCOUS CLEAR POWDER COATING SLURRY WHICH IS FREE OF ORGANIC SOLVENTS AND EXTERNAL EMULSIFIERS, METHOD FOR PRODUCING SAID SLURRY AND USE OF THE SAME

The present invention relates to a novel powder clearcoat slurry, free from organic solvents and external emulsifiers, which possesses pseudoplasticity. The present invention also relates to a novel process for preparing this powder clearcoat slurry. The invention relates not least to the use of the novel powder clearcoat slurry for producing clearcoats for the automotive sector and for the industrial sector, and also for coating moldings.

For the coating of automobile bodies, preference is given today to the use of liquid coating materials, i.e., spray paints. These give rise to numerous environmental problems owing to their solvent content. Aqueous basecoat materials for use in a basecoat/clearcoat system are described in DE 196 52 842. As the film-forming medium they comprise a dispersion of acrylic polymers and a nonassociative thickener. EP 0 038 127 discloses aqueous basecoat materials which are based on a dispersion of crosslinked polymer microparticles having a particle diameter of 0.01–10 $\mu$m. In both cases, after the continuous polymer film has formed, coating with a clearcoat material takes place. The use of waterborne clearcoat materials likewise gives rise to numerous environmental problems, since these still always contain certain amounts of organic solvents.

Waterborne clearcoat materials of this kind are known from the German patent DE-A-196 23 371. Directly after application, the conventional waterborne clearcoat materials do not dry to a powder but instead flow out to form a continuous film. They comprise aqueous secondary dispersions and are used in the automotive sector for aqueous multicoat systems or aqueous one-component or two-component clearcoats. The aim here is for sedimentation-stable dispersions having an average particle size of from about 10 to about 200 nm. The reason for this is the experience, familiar to the skilled worker, whereby, the better the stabilization and the smaller the size of dispersion particles, the less their tendency to settle. For reliable application behavior and in order to reduce the popping tendency, however, it is necessary to use up to 20% by weight of solvents as well.

For this reason, increased efforts have been made in recent years to use powder coating materials for the coating. The results to date, however, have not been satisfactory; in particular, powder clearcoat materials still show weaknesses with regard to chemical resistance and yellowing.

In the meantime, many developments have aimed to provide powder clearcoat materials in the form of aqueous dispersions that can be processed using liquid coating technologies. The patent U.S. Pat. No. 4,268,542, for example, discloses a process using a powder coating dispersion based on acrylic resins which are suitable for coating automobiles. In this case, first of all a conventional powder coat is applied to the body, after which the powder coating dispersion is applied as clearcoat. This powder clearcoat dispersion, also referred to those in the art as a powder slurry or powder clearcoat slurry, uses ionic thickeners, which lead to a relatively high sensitivity of the applied clearcoat film to moisture, especially to condensation.

The European patent EP-A-0 652 264 discloses a powder clearcoat slurry in which the solid binder and crosslinker components and, if desired, additives are, as is usual for the production of powder coating materials, first of all coextruded and then subjected to dry grinding, after which, in a further step of wet grinding, they are converted into a powder clearcoat slurry with the aid of emulsifiers and wetting agents. The aqueous powder coating dispersions described in the German patent DE 195 40 977 are also prepared by wet grinding. They comprise addition polymers containing epoxy groups, and also at least one nonionic thickener, and have a viscosity of 10–1 000 mPas at a shear rate of 500 s$^{-1}$. However, pseudoplasticity is not attained.

These customary and known powder clearcoat slurries, in contradistinction to the powder clearcoat materials, may be processed in conventional wet coating plants and may be applied at substantially lower coat thicknesses of about 40 $\mu$m, relative to about 80 $\mu$m in the case of powder coating materials, with good leveling and with a chemical resistance which is comparable with that of the powder coating materials.

However, the conventional grinding processes do not always ensure the degree of homogenization of the constituents which would in fact be desirable, or else such a degree must be achieved by means of a complicated multiple extrusion.

Normally, in the conventional powder clearcoat slurries, relatively large particles are unwanted since they tend toward sedimentation. Moreover, the powder clearcoat slurries, on application and crosslinking, exhibit an increased tendency to form popping marks (blisterlike cavities enclosed in the coating film).

The situation is similar with the cracking, known as "mudcracking" in the pulverulent, dry films which have been predried at room temperature or a slightly elevated temperature but not yet baked. On baking, drying cracks of this kind no longer flow out fully, and in the baked film they form visible flow defects in the form of furrows with a leathery texture, these drying cracks increasing in pronouncedness and frequency as the dry film thickness increases. Where automobile bodies are coated electrostatically, relatively high coat thicknesses may occur locally if there is a higher field line density at positions which, owing to their geometry, are particularly exposed. Such areas of excessive coating are particularly susceptible to mudcracking.

The German patent DE-A-196 17 086 discloses a powder clearcoat slurry in which the average size of the solid particles is from 0.1 to 10 $\mu$m. It is preferred in this case to employ average particle sizes of from 0.23 to 0.43 $\mu$m. For stabilization, it is necessary, in addition to the ionic stabilization, to employ external emulsifiers as well—generally polyethylene oxide adducts, which reduce the resistance of the coating to water and moisture. Moreover, these known powder clearcoat slurries still always include certain amounts of organic cosolvents or leathering agents, which cannot be removed since they are essential to the leveling properties of the partly dried film. Moreover, special equipment such as pressure release homogenizing nozzles are necessary for their preparation. Prior to their application, they are adjusted to the application viscosity using thickeners; however, a complex viscosity behavior is not described. Furthermore, the patent does not give any teaching as to how the problem of mudcracking in connection with powder clearcoat slurries might be solved.

It is an object of the present invention to provide a new powder clearcoat slurry which no longer has the disadvantages of the prior art. In particular, the novel powder clearcoat slurry should be preparable with a smaller number of processing steps than the conventional powder clearcoat slurries. However, on the basis of its typical powder slurry properties, with residual solvent contents of <1%, and its comparable particle sizes, it should have a similarly advantageous application behavior to said conventional powder clearcoat slurries. In contrast to the known waterborne clearcoat materials, the novel powder clearcoat slurries should ensure reliable application behavior with regard to popping marks at the required film thicknesses of approximately 40–50 μm, even without the assistance of organic solvents.

A further object of the present invention was to find a novel process for preparing powder clearcoat slurries which continues to ensure the essential advantage of the mixing of the components in solution: the very good homogeneity of the resulting particles.

The invention accordingly provides the novel, pseudoplastic powder clearcoat slurry which is free from organic solvents and external emulsifiers and comprises solid spherical particles with an average size of from 0.8 to 20 μm and a maximum size of 30 μm, at least one ionic thickener and at least one nonionic associative thickener, the powder clearcoat slurry having an ion-forming group content of from 0.05 to 1 meq/g, a neutralizing agent content of from 0.05 to 1 meq/g, and a viscosity of (i) from 50 to 1 500 mPas at a shear rate of 1 000 s$^{-1}$, (ii) from 150 to 8 000 mPas at a shear rate of 10 s$^{-1}$, and (iii) from 180 to 12 000 mPas at a shear rate of 1 s$^{-1}$.

In the text below, the novel, pseudoplastic powder clearcoat slurry free from organic solvents and external emulsifiers is referred to for short as the "slurry of the invention".

The invention additionally provides the novel process for preparing a pseudoplastic powder clearcoat slurry free from organic solvents and external emulsifiers by 1) emulsifying an organic solution comprising binder and crosslinker, to give an emulsion of the oil-in-water type,
2) removing the organic solvent or the organic solvents, and
3) replacing by water some or all of the volume of solvent removed, to give a powder clearcoat slurry comprising solid spherical particles, where 4) additionally, at least one ionic, especially anionic, thickener and at least one nonionic associative thickener are added to the powder clearcoat slurry.

In the text below, the novel process for preparing a pseudoplastic powder clearcoat slurry free from organic solvents and external emulsifiers is referred to for short as the "process of the invention".

For the slurry according to the invention it is essential for the average size of the solid particles to be from 0.8 and 20 μm, and particularly preferably from 3 to 15 μm. The average particle size is understood as meaning the 50% median according to the laser diffraction method, i.e. 50% of the particles have a diameter≦the median and 50% of the particles have a diameter≧the median.

Slurries having average particle sizes of this kind and a solvent content of <1% exhibit better application properties and, at the applied film thicknesses of >30 μm as presently practiced in the automotive industry for the finishing of automobiles, exhibit much less of a tendency toward popping and mudcracking than conventional powder clearcoat slurries.

The upper limit on particle size is reached when the size of the particles means that they are no longer able to flow out fully on baking, and thus the film leveling is adversely affected. In cases where requirements regarding the appearance are not very stringent, however, the limit may also be higher. 30 μm is considered a sensible upper limit, since above this particle size the spray nozzles of the highly sensitive application apparatus may become blocked.

The slurry of the invention is free from organic solvents. In the context of the present invention this means that it has a residual volatile solvent content of <1% by weight, preferably <0.5% by weight, and with particular preference <0.2% by weight. In accordance with the invention it is of very particular advantage if the residual content is below the gas-chromatographic detection limit.

In the context of the present invention, the expression "free from external emulsifiers" is to be understood in the same way.

The above-described particle sizes for use in accordance with the invention are thus obtained even without the aid of additional external emulsifiers if the binder has an ion-forming group content corresponding to an average acid number or amine number of from 3 to 56 g KOH/g solids (MEQ acid or MEQ amine of from 0.05 to 1.0 meq/g solids), preferably up to 28 (MEQ acid or MEQ amine: 0.5), and in particular up to 17 (MEQ acid or MEQ amine: 0.3).

In accordance with the invention, the general aim is for a low amount of such groups, since, when the customary crosslinking agents are used, such as blocked polyisocyanates, for example, free groups of this kind may remain in the film and may reduce the strength with regard to environmental substances and chemicals. On the other hand, the acid group content must still be sufficiently high to ensure the desired stabilization.

The ion-forming groups are neutralized 100%, or else only partially neutralized to <100%, with the aid of neutralizing agents. The amount of neutralizing agent is chosen such that the MEQ value of the slurry of the invention is below 1, preferably below 0.5, and in particular below 0.3 meq/g solids. In accordance with the invention it is of advantage if the amount of neutralizing agent corresponds at least to a MEQ value of 0.05 MEQ/g solids.

In general, therefore, the chemical nature of the binder is not restrictive provided it comprises ion-forming groups which are convertible by neutralization into salt groups and so are able to take on the function of ionically stabilizing the particles in water.

Suitable anion-forming groups are acid groups such as carboxylic, sulfonic or phosphonic acid groups. Accordingly, the neutralizing agents used are bases, such as alkali metal hydroxides, ammonia, or amines. Alkali metal hydroxides are suitable for use only to a limited extent, since the alkali metal ions are nonvolatile on baking and, owing to their incompatibility with organic substances, may cloud the film and lead to instances of loss of gloss. Consequently, ammonia or amines are preferred. In the case of amines, preference is given to tertiary amines. By way of example, mention may be made of N,N-dimethylethanolamine or aminomethylpropanolamine (AMP).

Suitable cation-forming groups are primary, secondary or tertiary amines. Accordingly, neutralizing agents used are, in particular, low molecular mass organic acids such as formic acid, acetic acid or lactic acid.

Binders which contain cation-forming groups are known from the field of electrodeposition coating materials. By way of example, reference may be made to the patents EP-A-0 012 463, EP-A-0 612 818 or U.S. Pat. No. 4,071,428.

For the preferred use of the slurry of the invention as unpigmented clearcoat materials in automotive finishing, preference is given to polymers or oligomers containing acid groups as ion-forming groups, since these so-called anionic binders are generally more resistant to yellowing than the class of the cationic binders.

Nevertheless, cationic binders with groups convertible into cations, such as amino groups, are likewise suitable for use in principle provided the field of use is tolerant of their typical secondary properties, such as their tendency toward yellowing.

As binders which contain anion-forming groups, it is possible to use any desired resins containing the abovementioned acid groups. However, it is important that they also carry further groups which ensure crosslinkability. In accordance with the invention, hydroxyl groups are preferred.

Suitable oligomers and polymers of this kind for use in accordance with the invention include hydroxyl-containing, preferably linear and/or branched and/or block, comb and/or random poly(meth)acrylates, polyesters, alkyds, polyurethanes, acrylated polyurethanes, acrylated polyesters, polylactones, polycarbonates, polyethers, (meth) acrylatediols or polyureas.

Besides the hydroxyl groups, the oligomers and polymers may also include other functional groups such as acryloyl, ether, amide, imide, thio, carbonate or epoxide groups, provided these do not disrupt the crosslinking reactions.

These oligomers and polymers are known to the skilled worker, and many suitable compounds are available on the market.

In accordance with the invention, the polyacrylates, the polyesters, the alkyd resins, the polyurethanes and/or the acrylated polyurethanes are of advantage and are therefore used with preference.

Examples of suitable polyacrylates are described in the European patent application EP-A-0 767 185 and the American patents U.S. Pat. Nos. 5,480,493, 5,475,073 or 5,534,598. Further examples of particularly preferred polyacrylates are sold under the brand name Joncryl$^R$, such as Joncryl$^R$ SCX 912 and 922.5, for instance. The preparation of these polyacrylates is widely known and is described, for example, in the standard work Houben-Weyl, Methoden der organischen Chemie, 4th edition, volume 14/1, pages 24 to 255, 1961.

The preparation of the polyesters and alkyd resins which are used with preference in accordance with the invention is widely known and is described, for example, in the standard work Ullmanns Encyklopadie der technische Chemie, 3rd edition, volume 14, Urban & Schwarzenberg, Munich, Berlin, 1963, pages 80 to 89 and pages 99 to 105, and also in the following books: "Résines Alkydes-Polyesters" by J. Bourry, Paris, Dunod, 1952, "Alkyd Resins" by C. R. Martens, Reinhold Publishing Corporation, New York, 1961, and "Alkyd Resin Technology" by T. C. Patton, Interscience Publishers, 1962.

The polyurethanes and/or acrylated poly-urethanes whose use is particularly preferred in accordance with the invention are described, for example, in the patents EP-A-0 708 788, DE-A-44 01 544 or DE-A-195 34 361.

Suitable crosslinkers include all crosslinking agents which are customary in the field of light-stable topcoat materials. Examples thereof are etherified melamine-formaldehyde resins, benzoguanamine resins, resins or compounds containing siloxane groups, resins or compounds containing anhydride groups, resins or compounds containing epoxide groups, blocked and/or unblocked polyisocyanates, and/or tris(alkoxycarbonyl-amino) triazines, as described in the patents U.S. Pat. No. 4,939,213, U.S. Pat. No. 5,084,541, U.S. Pat. No. 5,288,865 or EP-A-0 604 922. In accordance with the invention, the blocked polyisocyanates are of advantage and are therefore used with particular preference. Examples of suitable blocked polyisocyanates are described in the German patents DE-A-196 17 086 and 196 31 269 and also in the European patents EP-A-0 004 571 and 0 582 051.

The slurry of the invention comprises nonionic and ionic thickeners. This effectively counters the tendency of the comparatively large solid particles toward sedimentation.

Examples of nonionic thickeners are hydroxyethylcellulose and polyvinyl alcohols. Nonionic associative thickeners are likewise available on the market in diverse selection. They generally consist of water-dilutable polyurethanes, which are the reaction products of water-soluble polyetherdiols, aliphatic diisocyanates and monofunctional hydroxy compounds containing an organophilic radical.

Likewise commercially available are ionic thickeners. These usually contain anionic groups and are based in particular on special polyacrylate resins containing acid groups, some or all of which may have been neutralized.

Examples of suitable thickeners for use in accordance with the invention are known from the text-book "Lackadditive" [Additives for coatings] by Johan Bieleman, Wiley-VCH, Weinheim, N.Y., 1998, pages 31 to 65.

For the slurry of the invention it is important that both of the above-described types of thickener are present therein. The amount of thickeners to be added and the ratio of ionic to nonionic thickener is guided by the desired viscosity of the slurry of the invention, which in turn is determined by the required sedimentation stability and by the special requirements of spray application. The skilled worker will therefore be able to determine the amount of the thickeners and the ratio of the thickener types to one another on the basis of simple considerations, possibly with the aid of preliminary tests.

According to the invention, a viscosity range of from 50 to 1 500 mPas at a shear rate of 1 000 s$^{-1}$ and from 150 to 8 000 mPas at a shear rate of 10 s$^{-1}$, and also from 180 to 12 000 mPas at a shear rate of 1 s$^{-1}$, is set.

This viscosity behavior, known as "pseudoplasticity", describes a state which does justice both to the requirements of spray application, on the one hand, and to the requirements in terms of storage and sedimentation stability, on the other: in the state of motion, such as when pumping the slurry of the invention in circulation in the ring circuit of the coating installation and when spraying, for example, the slurry of the invention adopts a state of low viscosity which ensures easy processability. Without shear stress, on the other hand, the viscosity rises and thus ensures that the coating material already present on the substrate to be coated has a reduced tendency to form runs on vertical surfaces. In the same way, a result of the higher viscosity in the stationary state, such as during storage, for instance, is that sedimentation of the solid particles is largely prevented or that any slight degree of settling of the powder slurry of the invention during the storage period can be removed again by agitation.

In addition to the essential constituents described above, the solid particles of the slurry of the invention may comprise additives as commonly used in clearcoat materials. In this context it is essential that these additives do not substantially lower the glass transition temperature Tg of the binders.

Examples of suitable additives are polymers, crosslinking catalysts, defoamers, adhesion promoters, additives for improving substrate wetting, additives for improving surface smoothness, flatting agents, light stabilizers, corrosion inhibitors, biocides, flame retardants, and polymerization inhibitors, especially photoinhibitors, as described in the book "Lackadditive" by Johan Bielemann, Wiley-VCH, Weinheim, N.Y., 1998.

Crosslinking components of polyol type, reactive diluents or leveling assistants which may be incorporated by crosslinking in the film may be added to the slurry of the invention. It is important, however, that these components are located preferably in the external, aqueous phase of the slurry of the invention and not in the disperse organic phase, where they would bring about a lowering of the glass transition temperature Tg and thus coalescence or coagulation of any sedimented particles.

Examples of suitable compounds of this kind are oligomeric polyols, which are obtainable by hydroformylation and subsequent hydrogenation from oligomeric intermediates themselves obtained by metathesis reactions of acyclic monoolefins and cyclic monoolefins; examples of suitable cyclic monoolefins are cyclobutene, cyclopentene, cyclohexene, cyclooctene, cycloheptene, norbornene or 7-oxanor-bornene; examples of suitable acyclic monoolefins are present in hydrocarbon mixtures which are obtained in petroleum processing by cracking ($C_5$ cut); examples of suitable oligomeric polyols for use in accordance with the invention have a hydroxyl number (OHN) of from 200 to 450, a number-average molecular weight Mn of from 400 to 1 000, and a mass-average molecular weight $M_w$ of from 600 to 1 100; further examples of suitable compounds of this kind are branched, cyclic and/or acyclic $C_9$–$C_{16}$ alkanes functionalized with at least two hydroxyl groups, especially diethyloctanediols, and also cyclohexane-dimethanol, neopentyl glycol hydroxypivalate, neopentyl glycol, trimethylolpropane or pentaerythritol.

It is of advantage in accordance with the invention to prepare the slurry of the invention by means of the process of the invention.

In the process of the invention, the ionically stabilizable binders and the crosslinking agents and also, if appropriate, the additives are mixed in organic solution and dispersed together in water with the aid of neutralizing agents by the secondary dispersion process. The system is then diluted with water, while stirring. A water-in-oil emulsion is formed first of all, which on further dilution changes to become an oil-in-water emulsion. This point is generally reached at solids contents of <50% by weight, based on the emulsion, and is evident externally from a relatively sharp drop in viscosity in the course of dilution.

The emulsion thus obtained, which still contains solvent, is subsequently freed from solvents by means of azeotropic distillation.

The distillation temperature is guided primarily by the glass transition temperature Tg of the binder. In order to avoid coagulum, i.e., coalescence of the particles, which are only slightly stabilized in accordance with the invention, to form a separate continuous organic phase during the distillation, it is essential that the distillation temperature be held below the glass transition temperature Tg. The glass transition temperature may also be described, as a substitute, by the minimum film-forming temperature of the dispersion. The minimum film-forming temperature may be determined by drawing down the dispersion onto a glass plate using a bar coater and heating it in a gradient oven. The temperature at which the pulverulent layer films is designated the minimum film-forming temperature.

In accordance with the invention it is of advantage if the minimum film-forming temperature is more than 20° C., in particular more than 30° C.

It is of advantage in accordance with the invention if the solvents to be removed are distilled off at a distillation temperature below 70° C., preferably below 50° C. and in particular below 40° C. If appropriate, the distillation pressure is chosen so that in the case of higher-boiling solvents this temperature range is still maintained.

At its simplest, the azeotropic distillation may be realized by stirring the emulsion at room temperature in an open vessel for several days. In the preferred case, the solvent-containing emulsion is freed from the solvents by a vacuum distillation.

In order to avoid high viscosities, the amount of water and solvents removed by distillation or evaporation is replaced by water. The water may be added before, during or after the evaporation or distillation, in portions.

After the solvents have been lost, the glass transition temperature Tg of the dispersed particles rises, and instead of the previous solvent-containing emulsion (liquid-in-liquid dispersion) a solid-in-liquid dispersion, i.e., the slurry of the invention, is formed.

The slurry of the invention advantageously has a solids content of from 10 to 60% by weight, in particular from 20 to 50% by weight.

To produce the clearcoats of the invention, the slurry of the invention is applied to the substrate that is to be coated. No special measures need be taken here; instead, the application may take place in accordance with the customary and known techniques, which is another particular advantage of the slurry of the invention.

Following its application, the slurry of the invention dries without problems and does not film at the processing temperature, generally at room temperature. In other words, the slurry of the invention applied as a wet film loses water when flashed off at room temperature or slightly elevated temperatures, without the particles present therein altering their original solid form. The solid film in powder form loses the residual water by evaporation more easily than a flowing wet film. As a result, the risk of bubbles of evaporated water enclosed in the cured film (popping) is reduced. Moreover, the tendency toward mudcracking is extremely low. A surprising finding in this context is that the mudcracking tendency of the slurries of the invention is lower the higher their particle sizes.

In the subsequent baking step, the now substantially water-free powder layer is melted and caused to crosslink. In some cases, it may be of advantage to carry out the leveling process and the crosslinking reaction with a chronological offset, by operating in accordance with a staged heating program or a so-called heating ramp. The appropriate crosslinking temperature for the present examples is between 120 and 160° C. The corresponding baking time is between 20 and 60 minutes.

The clearcoat which results in this case has outstanding performance properties. For instance, it adheres firmly to all customary and known basecoats or to substrates such as metal, glass, wood or plastic. It is of high gloss, smooth, scratch-resistant, stable to weathering and free from defects. On the basis of its advantageous profile of properties, moreover, the slurry of the invention is also suitable for applications other than automotive finishing, especially for the coating of furniture and for industrial coating.

EXAMPLES

Preparation Example 1

The Preparation of Polyacrylate Resin Solutions 1.1 The Preparation of the Solution Polyacrylate Resin A 1 291.5 parts of methyl isobutyl ketone (MIBK) and 43.0 parts of mercaptoethanol were introduced into a reaction vessel and heated to 100° C. The initiator, consisting of 143.5 parts of TBPEH (tert-butyl perethylhexanoate) and 86.1 parts of MIBK, and the monomer mixture, consisting of 485.0 parts of tert-butyl acrylate, 254.0 parts of n-butyl methacrylate, 213.8 parts of cyclohexyl methacrylate, 409.0 parts of hydroxypropyl methacrylate and 73.2 parts of acrylic acid, were metered into this initial charge at 100° C. over the course of 5 h from two separate feed vessels. The reaction mixture was then heated to 110° C., and a fraction of the volatile components of the reaction mixture was stripped off under reduced pressure at 500 mbar for 5 h. The resin solution was then cooled to 80° C. and discharged.

The resin solution had the following characteristics:

| Solids: | 70.2% (1 h at 130° C.) |
|---|---|
| Viscosity: | 25.5 dPas (cone and plate viscometer at 23° C.; 70% strength solution) |
| Acid number: | 43.4 mg KOH/g resin solids |

1.2 The Preparation of the Solution Polyacrylate Resin B 1 076.7 parts of methyl isobutyl ketone (MIBK) and 35.9 parts of mercaptoethanol were introduced into a reaction vessel and heated to 100° C. The initiator, consisting of 119.6 parts of TBPEH (tert-butyl perethylhexanoate) and 71.8 parts of MIBK, and the monomer mixture, consisting of 404.2 parts of tert-butyl acrylate, 211.7 parts of n-butyl methacrylate, 239.2 parts of cyclohexyl methacrylate and 340.9 parts of hydroxypropyl methacrylate, were metered into this initial charge at 100° C. over the course of 5 h from two separate feed vessels. The reaction mixture was then heated to 115° C., and a fraction of the volatile components of the reaction mixture was stripped off under reduced pressure at 500 mbar for 3 h. The resin solution was then cooled to 80° C. and discharged.

The resin solution had the following characteristics:

| Solids: | 71.3% (1 h at 130° C.) |
|---|---|
| Viscosity: | 19.2 dPas (cone and plate viscometer at 23° C.; 70% strength solution) |
| Acid number: | 5 mg KOH/g resin solids. |

Preparation Example 2

The Preparation of a Blocked Polyisocyanate Crosslinker 837 parts of isophorone diisocyanate were introduced into an appropriate reaction vessel, and 0.1 part of dibutyltin dilaurate was added. A solution of 168 parts of trimethylolpropane and 431 parts of methyl ethyl ketone was then run in slowly. As a result of the exothermic reaction, the temperature rose. After it had reached 80° C., the temperature was kept constant by external cooling and the rate of addition of the feed stream was reduced slightly if necessary. After the end of the feed stream, the mixture was held at this temperature for about 1 hour until the isocyanate content of the solids had reached 15.7% (based on NCO groups). The reaction mixture was subsequently cooled to 40° C. and a solution of 362 parts of 3,5-dimethylpyrazole in 155 parts of methyl ethyl ketone was added over the course of 30 minutes. After the reaction mixture had heated up to 80° C., owing to the exothermic reaction, the temperature was kept constant for 30 minutes until the NCO content had dropped to less than 0.1%. Then 47 parts of n-butanol were added to the reaction mixture, which was held at 80° C. for a further 30 minutes and then, after brief cooling, was discharged.

The reaction product had a solids content of 69.3% (1 h at 130° C.).

Examples 1 and 2

The Preparation of the Inventive Powder Clearcoat Slurries 1 and 2

Example 1

The Preparation of the Inventive Powder Clearcoat Slurry 1 on the Basis of the Solution Polyacrylate Resin A From Preparation Example 1.1

812.1 parts of the acrylate resin solution A from preparation example 1.1 and 492.5 parts of the crosslinker solution from preparation example 2 were mixed at room temperature in an open vessel for 15 minutes with stirring. Then 16.2 parts of Cyagard 1164 (UV absorber from Cytec), 9.6 parts of Tinuvin liquid 123 (sterically hindered amine "HALS" from Ciba Geigy), 15.2 parts of N,N-dimethylethanolamine and 7.0 parts of dibutyltin dilaurate (DBTL) were added and the mixture was stirred at room temperature for a further 2 h. The mixture was then diluted with 561.3 parts of deionized water in small portions. After an interval of 15 minutes, a further 676.0 parts of DI water were added. This gave an aqueous emulsion of low viscosity with a theoretical solids content of 37%, which was stirred at room temperature for a further 48 hours. The amount of liquid evaporated off was supplemented by adding DI water until the original level was regained. This gave a powderous clearcoat suspension (slurry) having the following characteristics:

| Solids (2 h, 80° C.): | 35.6% |
|---|---|
| MEQ acid: | 0.52 meq/g solids |
| MEQ base: | 0.22 meq/g solids |
| Solvent content: | <0.05% (by gas chromatography) |
| Particle size: | 6 μm (D.50; laser diffractometer from Malvern) |

In order to produce the desired pseudoplasticity, 8.7 parts of Acrysol RM 8 (nonionic associative thickener from Rohm & Haas) and 6.0 parts of Viskalex (anionic thickener based on polyacrylate resin, from Allied Colloids) were incorporated by stirring into 1000 parts by weight of this powder clearcoat slurry. The viscosity profile of the resultant inventive powder clearcoat slurry 1 was as follows:

1 405 mPas at a shear rate of 10 s$^{-1}$
791 mPas at a shear rate of 100 s$^{-1}$
308 mPas at a shear rate of 1 000 s$^{-1}$ The inventive powder clearcoat slurry 1 had a minimum film-forming temperature of 35° C. After storage at room temperature for 4 weeks, there was a slight sediment, which had only settled loosely, and which could be reagitated again with a very high degree of homogeneity within 5 minutes using a simple laboratory stirrer.

Example 2

The Preparation of the Inventive Powder Clearcoat Slurry 2 on the Basis of the Solution Polyacrylate Resins A and B From Preparation Example 1.2

331.0 parts of the acrylate resin A from preparation example 1.1, 774.5 parts of the acrylate resin B from preparation example 1.2 and 715.8 parts of the crosslinker solution from preparation example 2 were mixed with one another as described in example 1. Then 4.8 parts of Cyagard 1146, 7.6 parts of Tinuvin 123, 10.0 parts of N,N-dimethylethanolamine and 5.5 parts of DBTL were added. After 2 hours of stirring, 723.0 parts of DI water were added in small portions and the resultant mixture was diluted 15 minutes later with a further 910.0 parts of DI water. The resulting powder clearcoat dispersion was transferred to a reactor and the solvent was removed as an azeotrope with the accompanying water under reduced pressure at from 25 to 35° C., the amount of distillate being replaced in the course of the distillation by 2000 parts of DI water in small portions, by way of a vacuum dropping funnel with a three-way tap. The distillation was continued until residual solvent was no longer detectable. The characteristics of the resulting powder clearcoat slurry were as follows:

| | | |
|---|---|---|
| Solids (2 h, 80° C.): | 44.3% | |
| MEQ acid: | 0.19 meq/g solids | |
| MEQ base: | 0.10 meq/g solids | |
| Solvent content: | <0.05% | (by gas chromatography) |
| Particle size: | 7 μm | (D.50; laser diffractometer from Malvern) |

In order to produce the desired pseudoplasticity, 7.8 parts of Acrysol RM 8 and 4.7 parts of Viskalex HV 30 were incorporated by stirring into 1000 parts of the powder clearcoat slurry. The viscosity profile of the inventive powder clearcoat slurry 2 was as follows:

243 mPas at a shear rate of 10 s$^{-1}$ 569 mPas at a shear rate of 1 000 s$^{-1}$.

The minimum film-forming temperature was 43° C. The inventive powder clearcoat slurry 2, following 3 weeks' storage at room temperature, was viscous and showed no sediment. After stirring with a simple laboratory stirrer, the low viscosity state was reestablished within 2 minutes, and the inventive powder clearcoat slurry 2 was applied in this state.

Examples 3 and 4

The use of the Inventive Powder Clearcoat Slurries 1 (Example 3) and 2 (Example 4) to Produce Clearcoats The inventive powder clearcoat slurries 1 and 2 were applied using a so-called integrated system, which is described below for the metallic shade "meteor gray":

Using a gravity feed gun, a functional coat (Ecoprime® Meteorgrau [meteor gray]; BASF Coatings AG) was applied to steel panels coated cathodically with a commercial electrocoat material. After flashing off at room temperature for 5 minutes, a meteor gray aqueous metallic basecoat (Ecostar® Meteorgrau; BASF Coatings AG) was applied in the same way to this coat and was subsequently predried at 80° C. for 5 minutes.

After the panels had been cooled, the inventive powder clearcoat slurries 1 (example 3) and 2 (example 4) were applied in the same way. Thereafter, the panels were first flashed off for 5 minutes and then predried at 40° C. for 15 minutes. They were subsequently baked at 145° C. for 30 minutes.

In the case of example 3, this gave an aqueous metallic overall coating system in the shade "meteor gray". The applied wet films had been chosen so that, after baking, the dry film thicknesses for the functional coat and for the aqueous metallic basecoat were each 15 μm. The inventive clearcoat 1 had a film thickness of from 40 to 45 μm.

The second panel, prepared in the same way, with the inventive powder clearcoat slurry 2 (example 4) again had a film thickness of 15 μm in each case for the functional coat and for the aqueous metallic basecoat. The inventive clearcoat 2 had a film thickness of from 44 to 48 μm.

Both inventive coatings had an outstanding appearance and exhibited a high level of stability in the chemical test. At the applied clear coat thicknesses, no defects in the form of popping marks and mudcracking are evident.

The table below gives an overview of the tests conducted and the results obtained in them.

TABLE

The performance properties of the inventive clearcoats 1 (example 3) and 2 (example 4)

| Properties | Example 3 | Example 4 |
|---|---|---|
| Clearcoat thickness | 40–45 μm | 45–48 μm |
| Gloss at 20°*[)] | 77 | 77 |
| Haze*[)] | 80 | 84 |
| Appearance | bright | glossy |
| Leveling | very good | good |
| Popping marks | none | none |
| Mudcracking | none | none |
| Chemical resistance:**[)] 1% strength | | |
| sulfuric acid | 56 | 46 |
| Pancreatin | 54 | >58 |
| Tree resin | 44 | 41 |
| Water | 54 | 49 |

*[)]Measuring instrument, manufacturer Byk;
**[)]Measurement by means of gradient oven, manufacturer Byk. The numerical value indicates the lower temperature above which drops of the corresponding substance applied to the coating leave visible traces;

What is claimed is:

1. A pseudoplastic powder clearcoat slurry which is free from organic solvents and external emulsifiers and comprises solid spherical particles with an average size of from 0.8 to 20 μm and a maximum size of 30 μm, at least one ionic thickener and at least one nonionic associative thickener, the powder clearcoat slurry having an ion-forming group content of from 0.05 to 1 meq/g, a neutralizing agent content of from 0.05 to 1 meq/g, and a viscosity of (i) from 50 to 1 500 mPas at a shear rate of 1 000 s$^{-1}$, (ii) from 150 to 8 000 mPas at a shear rate of 10 s$^{-1}$, and (iii) from 180 to 12 000 mPas at a shear rate of 1 s$^{-1}$.

2. The slurry as claimed in claim 1, having a solids content of from 10 to 60% by weight.

3. The slurry as claimed in claim 1, wherein the average size of the solid spherical particles is from 3 to 15 μm.

4. The slurry as claimed in claim 1, wherein the solid spherical particles comprise polyols as binders and crbsslinking agents selected from the group consisting of blocked polyisocyanates and tris(alkoxycarbonylamino) triazines and mixtures thereof.

5. The slurry as claimed in claim 4, comprising polyacrylates as binders and blocked polyisocyanates as crosslinking agents.

6. The slurry as claimed in claim 1, having a minimum film-forming temperature of more than 20° C.

7. A process for preparing a pseudoplastic powder clearcoat slurry free from organic solvents and external emulsifiers comprising the steps of
   1) emulsifying an organic solution comprising binder and crosslinker, to give an emulsion of the oil-in-water type,
   2) removing the organic solvent or the organic solvents, and 3) replacing with water some or all of the volume of solvent removed, to give a powder clearcoat slurry comprising solid spherical particles, and 4) adding at least one ionic thickener and at least one nonionic associative thickener to the powder clearcoat slurry wherein the powder clearcoat slurry has an ion-forming group content of from 0.05 to 1 meq/g, a neutralizing agent content of from 0.05 to 1 meq/g, and a viscosity of (i) from 50 to 1500 mPas at a shear rate of 1000 s$^{-1}$, (ii) from 150 to 8000 mPas at a shear rate of 10 s$^{-1}$, and (iii) from 180 to 12000 mPas at a shear rate of 1 s$^{-1}$.

8. The process as claimed in claim 7, wherein water-miscible organic solvents are used.

9. The process as claimed in claim 7 or 8, wherein the organic solvents are removed at temperatures below the glass transition temperature Tg of the binders.

10. The process as claimed in claim 7, wherein the solid spherical particles have an average size of from 0.8 to 20 μm and a maximum size of 30 μm.

11. The slurry as claimed claim 1, having a minimum film-forming temperature of more than 30° C.

12. The process as claimed in claim 7, wherein the ionic thickener is an anionic thickener.

13. The process as claimed in claim 7, wherein the solid spherical particles have an average particle size of from 3 to 15 μm.

14. The process as claimed claim 7, wherein the powder clearcoat slurry has an ion-forming group content of from 0.05 to 0.5, meq/g, a neutralizing agent content of from 0.05 to 0.3 meq/g, and a—viscosity of (i) from 50 to 1500 mpas at a shear rate of I 000 s$^{-1}$, (ii) from 150 to 8 000 mpas at a shear rate of 10 s$^{-1}$, and (iii) from 180 to 12 000 mPas at a shear rate of 1 s$^{-1}$.

15. The process as claimed in claim 7, wherein the powder clearcoat slurry has an ion-forming group content of from 0.05 to 0.3 meq/g, a neutralizing agent content of from 0.05 to 0.3 meq/g, and a—viscosity of (i) from 50 to 1500 mpas at a shear rate of I 000 s$^{-1}$, (ii) from 150 to 8 000 mpas at a shear rate of 10 s$^{-1}$, and (iii) from 180 to 12 000 mPas at a shear rate of 1 s$^{-1}$.

16. A coating for automotive OEM finishing, automotive refinish and industrial coating comprising the coating composition defined in claim 1.

17. A coating for the coating of moldings selected from the group consisting of metal, glass, wood and plastic, comprising the powder clearcoat slurry as claimed in claim 1.

* * * * *